United States Patent [19]

Burwell, Jr. et al.

[11] 4,135,384

[45] Jan. 23, 1979

[54] METHOD OF DETERMINING ELECTROLYTE LEAKAGE IN HERMETICALLY SEALED ELECTROCHEMICAL CELL

[75] Inventors: Anson C. Burwell, Jr.; John J. Decker, both of Emporium, Pa.

[73] Assignee: GTE Sylvania Incorporated, Stamford, Conn.

[21] Appl. No.: 850,017

[22] Filed: Nov. 9, 1977

Related U.S. Application Data

[63] Continuation of Ser. No. 727,770, Sep. 29, 1976, abandoned.

[51] Int. Cl.$^2$ ............................................. G01M 3/16
[52] U.S. Cl. .................................. 73/40.7; 73/49.3; 429/90
[58] Field of Search ................. 73/40, 40.7, 41, 41.2, 73/41.3, 41.4, 45.5, 49.3, 52; 23/230 L; 429/90

[56] References Cited

U.S. PATENT DOCUMENTS

| | | | |
|---|---|---|---|
| 2,930,828 | 3/1960 | Herold | 429/90 |
| 3,270,552 | 9/1966 | Davis | 73/41.2 |
| 3,505,775 | 4/1970 | Andersen et al. | 73/52 |
| 3,653,254 | 4/1972 | Simon | 73/46 |
| 3,729,984 | 5/1973 | Waldherr | 73/52 |
| 3,872,714 | 3/1975 | Carlson, Jr. | 73/46 |
| 3,956,923 | 5/1976 | Young et al. | 73/40.7 X |
| 3,981,701 | 9/1976 | Anderson et al. | 73/40.7 X |

Primary Examiner—Richard C. Queisser
Assistant Examiner—Joseph W. Roskos
Attorney, Agent, or Firm—William H. McNeill

[57] ABSTRACT

Hermetically sealed electrochemical cells are checked for electrolyte leakage by immersing the completed cell in a liquid medium such as chemically pure deionized water and monitoring the medium for electrical and/or chemical changes that would be caused therein if the electrolyte were leaking from the cell. Such changes could be determined by measuring the electrical conductivity of the liquid medium, the ion concentration, or the pH.

6 Claims, 2 Drawing Figures

METHOD OF DETERMINING ELECTROLYTE LEAKAGE IN HERMETICALLY SEALED ELECTROCHEMICAL CELL

CROSS-REFERENCE TO RELATED APPLICATION

This application is a continuation of Ser. No. 727,770, filed Sept. 29, 1976, now abandoned and assigned to the assignee of the present invention.

BACKGROUND OF THE INVENTION

This invention relates to electrochemical cells and more particularly to a method for checking such cells for electrolyte leaks. Recent industry demands for greater power capabilities in smaller and smaller packages has lead to the development of small, high-power batteries or electrochemical cells utilizing very reactive and/or corrosive materials. Such cells employ lithium as one of the electrodes and many use thionyl chloride as the electrolyte. Both of these materials are very reactive and the thionyl chloride, particularly, is very corrosive material. It is essential therefore, not only from the practical standpoint of operability, but from the standpoint of user safety, that batteries utilizing these components and being sold to the general public be as leak-proof as possible. In the past it has been extremely difficult to test all of the given production run of cells for small leaks.

Obviously, all cells are given at least some visual inspection for electrolyte leakage but this has been found to be insufficient. Also, in the past, it has been difficult to check an electrochemical cell for leaks by other than visual means without discharging the cell. It will be apparent that where primary cells are being considered this is a self-destructive checking condition. Accordingly, it would be an advance in the art if such cells could be checked for leakage in a manner that not only did not discharge the cell but was inherently efficient.

OBJECTS AND SUMMARY OF THE INVENTION

It is therefor an object of this invention to obviate the disadvantages of the prior art.

It is another object of this invention to enhance the testing of electrochemical cells for leakage.

It is yet another object of the invention to provide a method for 100% testing of electrochemical cells for leakage in a manner that will not discharge the cell.

These objects are accomplished in one aspect of the invention by a provision of a method for determining the presence or absence of electrolyte leakage in a hermetically sealed electrochemical cell which comprises immersing the cell in a liquid medium which is sensitive to the presence of the electrolyte or components of the electrolyte. This medium is then monitored for changes caused by the electrolyte or the components thereof. By employing a liquid medium that is chemically pure and substantially non-electrically conductive this goal can be accomplished.

DESCRIPTION OF THE PREFERRED EMBODIMENT

For a better understanding of the present invention together with other and further objects, advantages, and capabilities thereof reference is made to the following disclosure and appended claims taken in conjunction with the above-described drawings.

While the teachings of the method contained herein have applicability to a broad range of electrochemical cells the following descriptions shall be specifically pertinent to one of the so-called lithium batteries. Such batteries employ a metal can having a metal cover and a stem lead isolated electrically from the can and the cover projecting through the cover. As components, the cells employ an alkali metal, such as lithium, as the anode and any one of a number of materials as a cathode or a cathode collector. One such material in common use for the cathode is carbon. Such cells can employ an electrolyte comprising a solvent of thionyl chloride containing therein a solute of lithium-aluminum tetrachloride. Most of the leakage problems in the cells are caused by the escape of the electrolyte which, as mentioned above, can be thionyl chloride. This is a very volatile and corrosive material and will escape from any cell that is less than perfectly hermetically sealed.

Figure 1:
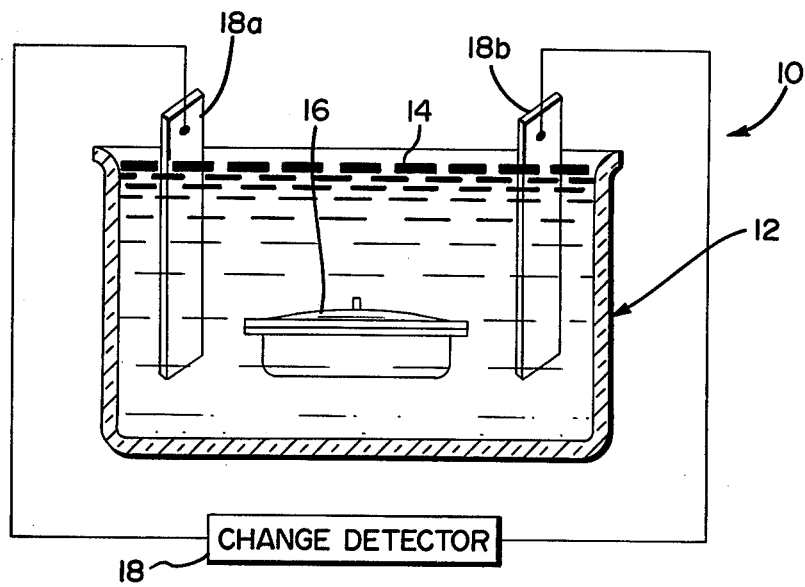
FIG. 1 is a diagrammatic view partially in section illustrating generically an apparatus that can be employed with this invention.
Figure 2:
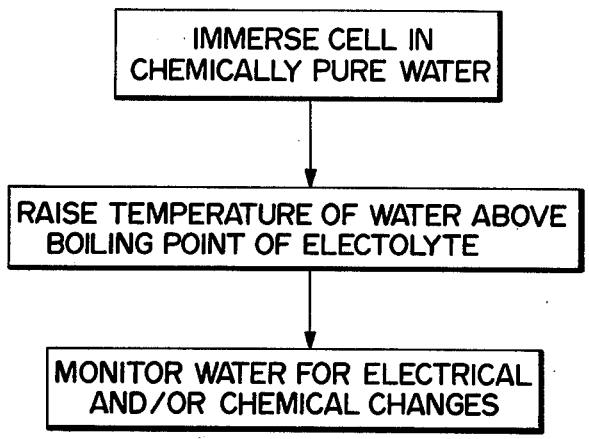
FIG. 2 is a flow diagram of the method of this invention.

Referring now to the invention with greater particularlity and with specific reference to FIG. 1, there is shown an apparatus 10 which comprises an electrically insulating container 12 of a suitable material such as glass. This container is provided with a liquid medium 14 which is chemically pure to the point of being substantially non-electrically conductive. Such a material, for example, is preferably chemically pure deionized water, it being noted that the electrical conductivity of chemically pure water is very low; consequently a cell will not be discharged as long as the cell is initially cleaned before deposition within the fluid medium. Such cleanliness is obviously important and a water wash and a methanol wash applied to the outside of the cell is recommended before immersion.

After providing the container and suitable fluid a cell 16 such as that described above is immersed completely in the fluid. The fluid is monitored for any changes caused therein by electrolyte leakage. Such monitoring can be by the generically shown change detector 18 which, in this instance, is shown as being some form of suitable readout apparatus attached to a pair of spaced electrodes 18a and 18b contained within the fluid medium 14. The change detector 18 can monitor changes in the electrical conductivity of the medium, the ion concentration of the medium, or the pH of the medium.

To further insure adequate testing for leaks, the temperature of the liquid medium should be raised above the boiling point of the electrolyte. By maintaining the temperature of the liquid medium at this level, the pressure inside of the electrochemical cell will be increased and thereby the tendency for the electrolyte to escape through any hole in the battery case will also be increased. When a battery is being tested that has an electrolyte of thionyl chloride, which has a boiling point of 79° C, then the liquid medium, which can be water, should be raised to a temperature in excess of 80° C. In the case of the water liquid medium and a thionyl chloride electrolyte, the system works because the thionyl chloride will decompose upon contact with water into sulfur dioxide and hydrogen chloride. These gases are soluble in water and will change the conductivity of the medium, the chloride ion concentration, and the pH. Consequently, leaks can be determined by monitoring any one or more of these conditions.

It will be seen from the above that there is herein provided a simple and novel means of non-destructively checking hermetically sealed electrochemical cells for electrolyte leakage. The system provides for a multiplicity of checking media which can be the conductivity of the medium, the ion concentration, or the pH. It is a system that easily provides for 100% leakage checks.

While there have been shown and described what are at present considered to be the preferred embodiments of the invention, it will be obvious to those skilled in the art that various changes and modifications can be made herein without departing from the scope of the invention as defined by the appended claims.

What is claimed is:

1. In a method of non-destructively determining the presence or absence of electrolyte leakage in a hermetically sealed primary electrochemical cell the steps comprising: immersing said cell in a dielectric liquid medium which is sensitive to the presence of said electrolyte or components of said electrolyte, said liquid having a temperature greater than the boiling point of said electrolyte; and monitoring said liquid medium for changes therein caused by said electrolyte or said components thereof.

2. The method of claim 1 wherein said monitoring step comprises: checking the electrical conductivity of said liquid medium for changes therein.

3. The method of claim 1 wherein said monitoring step comprises checking the ion concentration of said liquid medium.

4. The method of claim 1 wherein said monitoring step comprises checking the pH of said liquid medium.

5. The method of claim 1 wherein said liquid is chemically pure water and said electrolyte is thionyl chloride.

6. The method of claim 5 wherein said water temperature is greater than 80° C.